(12) United States Patent
    Li

(10) Patent No.: US 11,483,729 B2
(45) Date of Patent: Oct. 25, 2022

(54) RADIO RESOURCE ADJUSTMENT METHOD AND RELATED DEVICE

(71) Applicant: HUAWEI TECHNOLOGIES CO., LTD., Shenzhen (CN)

(72) Inventor: Huan Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/891,199

(22) Filed: Jun. 3, 2020

(65) Prior Publication Data

US 2020/0296617 A1    Sep. 17, 2020

Related U.S. Application Data

(63) Continuation of application No. PCT/CN2018/105870, filed on Sep. 15, 2018.

(30) Foreign Application Priority Data

Dec. 12, 2017 (CN) .......................... 201711324294.3

(51) Int. Cl.
    *H04W 28/02* (2009.01)
    *H04W 4/029* (2018.01)
    (Continued)

(52) U.S. Cl.
    CPC .... *H04W 28/0236* (2013.01); *G01C 21/3446* (2013.01); *G06Q 50/30* (2013.01);
    (Continued)

(58) Field of Classification Search
    CPC ... H04L 45/00; H04L 45/34; H04L 29/08738; H04L 29/08758; H04L 41/0813;
    (Continued)

(56) References Cited

U.S. PATENT DOCUMENTS 6,898,432 B1 * 5/2005 Jiang ..................... H04W 4/029
                                                          455/456.1
9,123,014 B1 * 9/2015 Erdmann ........... G01C 21/3617
                    (Continued)

FOREIGN PATENT DOCUMENTS

CN         102300319 A      12/2011
CN         104640224 A       5/2015
                    (Continued)

*Primary Examiner* — Warner Wong
(74) *Attorney, Agent, or Firm* — Maier & Maier, PLLC

(57) ABSTRACT

A radio resource adjustment method includes: receiving a network quality optimization request, sent by a path planning device, carrying a travel path and an estimated moment corresponding to a target location on the travel path through which a mobile terminal passes; matching the travel path with a coverage area of a base station, to determine a base station set to which a signal covering the travel path belongs; generating an optimization policy including configuration information for configuring a radio resource of the base station set based on the corresponding estimated moment; and sending an adjustment command to the network element management device based on the optimization policy, so that the network element management device instructs, based on the adjustment command, a target base station in the base station set to adjust allocation of the radio resource at the estimated moment.

11 Claims, 12 Drawing Sheets

(51) Int. Cl.
*G01C 21/34* (2006.01)
*G06Q 50/30* (2012.01)
*H04W 28/06* (2009.01)

(52) U.S. Cl.
CPC ....... *H04W 4/029* (2018.02); *H04W 28/0268* (2013.01); *H04W 28/06* (2013.01)

(58) Field of Classification Search
CPC ............... H04L 41/082; H04L 41/0823; H04L 21/08738; H04L 67/2814; H04W 28/00; H04W 28/0236; H04W 28/02; H04W 28/029; H04W 28/0268; H04W 28/06; H04W 28/0226; H04W 24/02; H04W 40/02; H04W 40/026; H04W 40/20; H04W 40/36; H04W 36/00; G06W 50/30; G06W 50/32; G01C 21/34; G01C 21/3446

See application file for complete search history.

(56) References Cited

U.S. PATENT DOCUMENTS

| | | | |
|---|---|---|---|
| 2004/0017310 A1* | 1/2004 | Vargas-Hurlston | H04W 28/18 342/357.4 |
| 2010/0254346 A1* | 10/2010 | Jain | H04W 36/32 370/331 |
| 2010/0323715 A1* | 12/2010 | Winters | G01S 5/0294 455/456.1 |
| 2013/0035083 A1* | 2/2013 | Kadel | H04W 84/005 455/418 |
| 2014/0254543 A1* | 9/2014 | Engelhard | H04W 72/048 370/329 |
| 2015/0120087 A1* | 4/2015 | Duan | H04W 4/40 701/1 |
| 2016/0029370 A1* | 1/2016 | Hayes | H04W 4/02 455/418 |
| 2016/0044571 A1 | 2/2016 | Choi et al. | |
| 2016/0216125 A1* | 7/2016 | Ahn | G06Q 50/30 |
| 2017/0168480 A1* | 6/2017 | Wanstedt | G07C 5/008 |
| 2017/0272972 A1* | 9/2017 | Egner | H04W 28/0268 |
| 2018/0227386 A1* | 8/2018 | Duan | H04L 67/10 |
| 2022/0191667 A1* | 6/2022 | Starsinic | H04M 15/68 |

FOREIGN PATENT DOCUMENTS

| | | |
|---|---|---|
| CN | 105228192 A | 1/2016 |
| CN | 105376813 A | 3/2016 |
| CN | 106921939 A | 7/2017 |
| EP | 2555569 A1 | 2/2013 |
| JP | 2014-003355 A | 1/2014 |
| WO | 2016176965 A1 | 11/2016 |

* cited by examiner

RADIO RESOURCE ADJUSTMENT METHOD AND RELATED DEVICE

CROSS-REFERENCE TO RELATED APPLICATIONS

This application is a continuation of International Application No. PCT/CN2018/105870, filed on Sep. 15, 2018, which claims priority to Chinese Patent Application No. 201711324294.3, filed on Dec. 12, 2017. The disclosures of the aforementioned applications are hereby incorporated by reference in their entireties.

TECHNICAL FIELD

Embodiments relate to the communications field, and in particular, to a radio resource adjustment method and a related device.

BACKGROUND

As radio network coverage constantly increases, widespread application of mobile phone applications brings great convenience for life of a user. In particular, an online ride-hailing vehicle has become a new form of travel for people. In most cases, when the user takes an online ride-hailing vehicle, especially when the user takes the online ride-hailing vehicle across a relatively long distance during a relatively long period, the user uses a mobile terminal to access the Internet to deal with things or kill time. For example, when taking the online ride-hailing vehicle, the user sends an email, places a call, chats by using WeChat, or plays games. Users of online ride-hailing vehicles are generally high-quality network users with relatively high consumption power, especially, some VIP users. Therefore, it is important to provide a better radio network service to such users.

Currently, a commonly used method is a key performance indicator (KPI) method. The KPI method is as follows: When a network runs for a period of time, data such as a call drop rate and a handover success rate of the network is collected and analyzed, a result of the analysis is associated with a location of a base station and a location of a cell, and specific adjustment is performed on an area with non-ideal indicators. For example, network quality is poor when a user A is at a first location during a first time period, the network quality for the first time period is analyzed, and the network quality at the location of the cell is optimized based on a result of the analysis, that is, a radio network quality for a next time period (a second time period) of the first time period is optimized. However, the user A at the second time period may not be at the location of the cell. Therefore, a network service quality of experience may be very poor for the user A.

A current network quality adjustment method is to optimize network quality after a user has experienced poor network service quality, and current radio communication quality cannot be fully ensured when the user is in a travelling process or a moving process.

SUMMARY

Embodiments of this application provide a radio resource adjustment method and a related device, to fully ensure that radio communications experience of a user in a travelling process or a moving process.

According to a first aspect, an embodiment of this application provides a radio resource adjustment method. The method is applied to a communications system, and the communications system includes a mobile terminal, a path planning device, an optimization processing device, a network element management device, and a network element. The method includes: receiving, by the optimization processing device, a network quality optimization request sent by the path planning device, where the network quality optimization request carries a travel path and an estimated moment corresponding to a target location on a travel path through which the mobile terminal passes; matching the travel path with a coverage area of a radiated signal of a base station, to determine a base station set to which a signal covering the travel path belongs, where the base station set includes at least one target base station; then generating an optimization policy based on the base station set and the estimated moment, where the optimization policy includes configuration information for configuring a radio resource for the target base station in the base station set based on a corresponding estimated moment; and sending an adjustment command to the network element management device based on the optimization policy, so that the network element management device instructs, based on the adjustment command, the target base station in the base station set to adjust allocation of the radio resource at the estimated moment. In this embodiment of this application, the optimization processing device receives the network quality optimization request sent by the path planning device, where the network quality optimization request carries the travel path and the estimated moment corresponding to the target location on the travel path through which the mobile terminal passes. The optimization processing device pre-determines a target location and an estimated moment at which network optimization needs to be performed, matches the travel path with the coverage area of the base station, to determine a base station set to which the signal covering the travel path belongs, and generates an optimization policy based on the target base station in the base station set and the estimated moment, where the optimization policy includes configuration information for configuring the radio resource of the target base station based on an estimated moment when a vehicle arrives. The optimization processing device sends the adjustment command to the network element management device based on the configuration information of the target base station in the optimization policy and the estimated moment, so that the network element management device instructs, based on the adjustment command, the target base station in the base station set to adjust the allocation of the radio resource at the estimated moment. This ensures dynamic optimization configuration of a radio resource on a path at which a user actually travels, thereby fully ensuring radio communications experience of the user in a travelling process or a moving process.

In an embodiment, the generating an optimization policy based on the base station set and the estimated moment may include: determining a target base station that matches each target location; performing, based on the estimated moment and the target location at which a vehicle arrives at the estimated moment, parameter configuration on the target base station that matches each target location, to obtain configuration information; and generating the optimization policy based on the estimated moment and the configuration information, where the configuration information includes but is not limited to parameters such as a beam width of a base station antenna, a tilt angle of the antenna, and a direction of the antenna, and cell coverage is adjusted by using the configuration information, so that communication quality of the mobile terminal can be improved when the user arrives in the area at the estimated moment.

In an embodiment, the optimization policy includes a correspondence between the travel path and configuration information corresponding to the travel path, and the method further includes: receiving a travel path cancellation request sent by the path planning device, where the travel path cancellation request includes information about a target travel path; and deleting target configuration information for the target travel path from the optimization policy based on the correspondence. In this embodiment of this application, the optimization policy is dynamically changed. If the user temporarily cancels a travel plan, the mobile terminal sends the path cancellation request to the path planning device, where the path cancellation request includes the information about the target travel path; and the optimization processing device deletes the target configuration information for the target travel path from the optimization policy based on the correspondence, to save the radio resource.

In an embodiment, after the generating an optimization policy based on the base station set and the estimated moment, the method may further include: determining, by the optimization processing device, an optimization result based on the optimization policy, where the optimization result carries information about the travel path, and the optimization result is used to indicate quality of a signal covering the travel path at the estimated moment; and feeding back the optimization result to the path planning device, so that the path planning device determines, based on the information about the travel path, user information corresponding to the information about the travel path, and sends the signal quality to a mobile terminal corresponding to the user information, to notify the user of a current radio network quality, to directly present the network quality to the user, so that the user is more involved.

According to a second aspect, an embodiment of this application provides a computer storage medium, configured to store computer software instructions used by the foregoing optimization processing device. The computer storage medium contains a program designed for executing the foregoing aspects.

According to a third aspect, an embodiment of this application provides an optimization processing device that has a function actually performed by the optimization processing device in the foregoing method. The function may be implemented by hardware, or may be implemented by hardware executing corresponding software. The hardware or software includes one or more modules corresponding to the function.

According to a fourth aspect, a structure of an optimization processing device includes a memory, a network interface, and a processor. The memory is configured to store computer executable program code, and is coupled to the network interface. The program code includes an instruction, and when the processor executes the instruction, the instruction enables the optimization processing device to execute information or an instruction used in the foregoing method.

According to a fifth aspect, an embodiment of this application provides a radio resource adjustment method. The method includes: obtaining, by a path planning device, a travel path and an estimated moment corresponding to a target location on the travel path through which a mobile terminal passes; and sending, by the path planning device, a network quality optimization request to an optimization processing device, where the network quality optimization request includes the travel path and the estimated moment, so that the optimization processing device matches the travel path with a coverage area of a base station based on the travel path, to determine a base station set to which a signal covering the travel path belongs; generates an optimization policy based on the base station set and the estimated moment, where the optimization policy includes configuration information for configuring a radio resource of the base station set based on a corresponding estimated moment; and sends an adjustment command to a network element management device based on the optimization policy, so that the network element management device instructs, based on the adjustment command, the base station set to adjust allocation of the radio resource at the estimated moment. In this embodiment of this application, dynamic optimization configuration of a radio resource on a path at which a user actually travels is, thereby fully ensuring radio communications experience of the user in a travelling process or a moving process.

In an embodiment, the obtaining a travel path and an estimated moment corresponding to a target location on a travel path through which a mobile terminal passes may include: receiving a path planning request sent by the mobile terminal, where the path planning request includes user information, a start location, a destination location, and a departure time, and in this implementation, a purpose of sending, by the mobile terminal, a vehicle use request to the path planning device is to enable the path planning device to plan a better travel path for the user; planning, by the path planning device, based on the start location and the destination location, a travel path corresponding to the user information; and determining, based on the travel path and the departure moment, the estimated moment corresponding to the target location on the travel path through which the mobile terminal passes.

In an embodiment, the obtaining a travel path and an estimated moment corresponding to a target location on a travel path through which a mobile terminal passes includes: receiving travel path reservation information sent by the mobile terminal, where the travel path reservation information includes user information, a travel path, and information about a moment of departing from a start point of the travel path, and in this implementation, a purpose of sending, by the mobile terminal, a vehicle use request to the path planning device is to reserve a determined travel path; and determining, by the path planning device based on the travel path and the departure time, the estimated moment corresponding to the target location on the travel path through which the mobile terminal passes.

In an embodiment, the method further includes: establishing, by the path planning device, a correspondence between the travel path and the user information; receiving an optimization result of the optimization processing device, where the optimization result is used to indicate quality of a signal covering the travel path at the estimated moment; and feeding back, based on the correspondence between the travel path and the user information, signal quality on the travel path to a mobile terminal corresponding to the user information. The path planning device sends the signal quality to the mobile terminal corresponding to the user information, to notify the user of a current radio network quality, to directly present the network quality to the user, so that the user is more involved.

In an embodiment, the user information includes a user priority identifier, and the travel path includes a first path and at least one second path. The obtaining a travel path includes: when the user priority identifier indicates a first priority, determining a first path corresponding to the user information, where the first path is a path that is estimated by a user to an actual travel; and generating at least one second path, where the second path is an interference path of the first path; and the radio resource adjustment method further includes: establishing an association relationship between the user information and the at least one second path and the first path, to prevent the path planning device from being attacked, and from leaking an actual travel path of the user, thereby ensuring travel security of the user.

In an embodiment, the user information includes a user level identifier, the user level identifier is used to indicate a priority of the user, the travel path corresponds to the target user, and the path planning device may determine the target user based on the user level identifier, where the target user is a user whose priority is greater than or equal to a threshold. If there are a large quantity of users of online ride-hailing vehicles in a time period, a dynamic optimization service of radio network quality cannot be ensured for all users, and only some users can be provided with the optimization service of the radio network quality. Therefore, the path planning device may determine, based on a user level identifier in the user information, to provide the optimization service of the network quality for a user with a relatively high priority, thereby improving experience of the user with the relatively high priority.

According to a sixth aspect, an embodiment of this application provides a computer storage medium, configured to store computer software instructions used by the foregoing path planning device. The computer storage medium contains a program designed for executing the foregoing aspects.

According to a seventh aspect, an embodiment of this application provides a path planning device that has a function actually performed by the path planning device in the foregoing methods. The function may be implemented by hardware, or may be implemented by hardware executing corresponding software. The hardware or software includes one or more modules corresponding to the function.

According to an eighth aspect, a structure of the path planning device includes a memory, a network interface, and a processor. The memory is configured to store computer executable program code, and is coupled to the network interface. The program code includes an instruction, and when the processor executes the instruction, the instruction enables the path planning device to execute information or an instruction used in the foregoing method.

DETAILED DESCRIPTION OF EMBODIMENTS

Embodiments of this application provide a radio resource adjustment method and a related device, configured to perform dynamic optimization configuration for a radio resource, thereby fully ensuring radio communications experience of a user in a travelling process or a moving process.

In the specification, claims, and accompanying drawings of this application, the terms "first", "second", "third", "fourth", and so on (if existent) are intended to distinguish between similar objects but do not necessarily indicate a specific order or sequence. The data used in such a way is interchangeable in proper circumstances so that the embodiments of this application described herein can be implemented in other orders than the order illustrated or described herein. In addition, the terms "include", "contain", and any other variants mean to cover the non-exclusive inclusion, for example, a process, method, system, product, or device that includes a list of steps or units is not necessarily limited to those listed steps or units, but may include other steps or units that are not expressly listed or inherent to such a process, method, system, product, or device.

An online ride-hailing vehicle brings great convenience for a user to travel. However, with an increase of urban congestion points, real-time navigation for finding an optimal path is greatly demanded. The optimal path is an expected path of an actual travel selected by the user. Therefore, how to ensure good communications experience on the optimal path becomes an urgent problem to be resolved. Embodiments of this application provide a method for optimizing network quality of an expected travel path for a mobile user, to ensure the dynamic optimization configuration of the radio resource on the path of the actual travel of the user, thereby fully ensuring radio communications experience of the user in a travelling process or a moving process.

Figure 1:
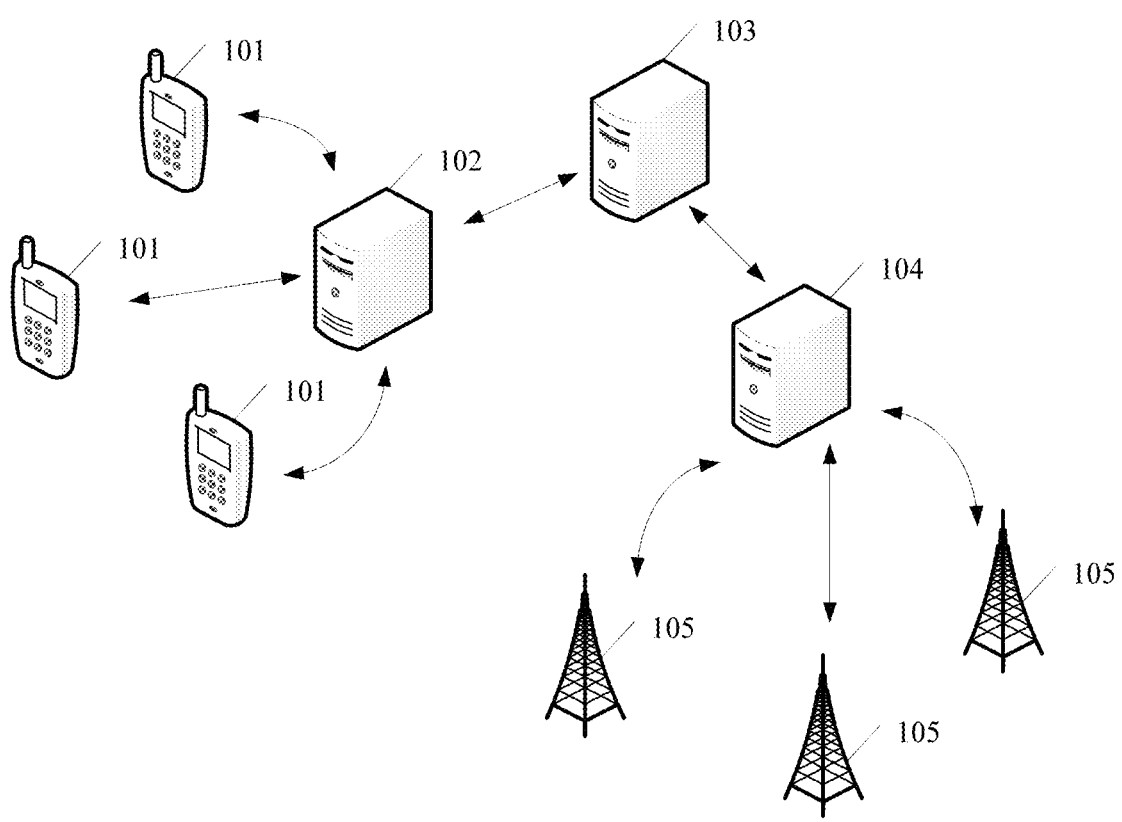
FIG. 1 is a system architectural diagram of a communications system according to an embodiment of this application.

An embodiment of this application provides a radio resource adjustment method. The radio resource adjustment method is applied to a communications system. FIG. 1 is a network architecture diagram of the communications system. The communications system includes a mobile terminal 101, a path planning device 102, an optimization processing device 103, a network element management device 104, and a network element 105.

The mobile terminal 101 includes but is not limited to a mobile phone, a notebook computer, a palmtop computer (for example, personal digital assistant), and the like. The mobile terminal 101 is configured to send a path planning request to the path planning device 102, where the path planning request includes a departure place, a destination place, a departure moment, and the like. The path planning request is used to instruct the path planning device 102 to plan a travel path for a user based on information such as the departure place, the destination place, and the departure moment. Alternatively, the mobile terminal 101 may send a reserved travel path and a reserved departure time to the path planning device 102.

The path planning device 102 may be provided by a third-party path provider, for example, an online ride-hailing vehicle management platform. The path planning device 102 is configured to: provide vehicle information for a user, plan a travel path for the user, and provide a travel path to be passed through by the user and total estimated duration for passing through the travel path. Alternatively, the path planning device 102 may split the path into a plurality of path segments, and provide estimated duration for passing through each path segment, in other words, provide an estimated moment of a segment point for passing through the path. The path planning device 102 sends generated path information and time information corresponding to the path information to the optimization processing device.

The optimization processing device 103 may be an operations support system, provides a capability of connecting to the path planning device 102, may generate a corresponding optimization policy based on the path information and the time information corresponding to the path information, decomposes the optimization policy into a radio resource adjustment command, sends the adjustment command to the network element management device 104, and sends the adjustment command based on a time period, to implement dynamic network adjustment and recovery.

The network element management device 104 is responsible for connecting the optimization processing device 103 and the network element 105. A maintenance channel is established between the network element management device 104 and a base station, and the network element management device 104 may deliver a command to the network element 105 through the channel. The network element management device 104 also provides a command delivery channel for the optimization processing device 103, and receives the adjustment command delivered by the optimization processing device 103.

The network element 105 is a radio communications device, including various types of base stations, base station controllers, and the like. These devices provide a network communications capability, including but not limited to a voice service and a data service. The network element 105 receives the radio resource adjustment command sent by the network element management device 104, and adjusts a radio resource based on the adjustment command, thereby ensuring better signal quality on a travel path of the user.

Figure 2:
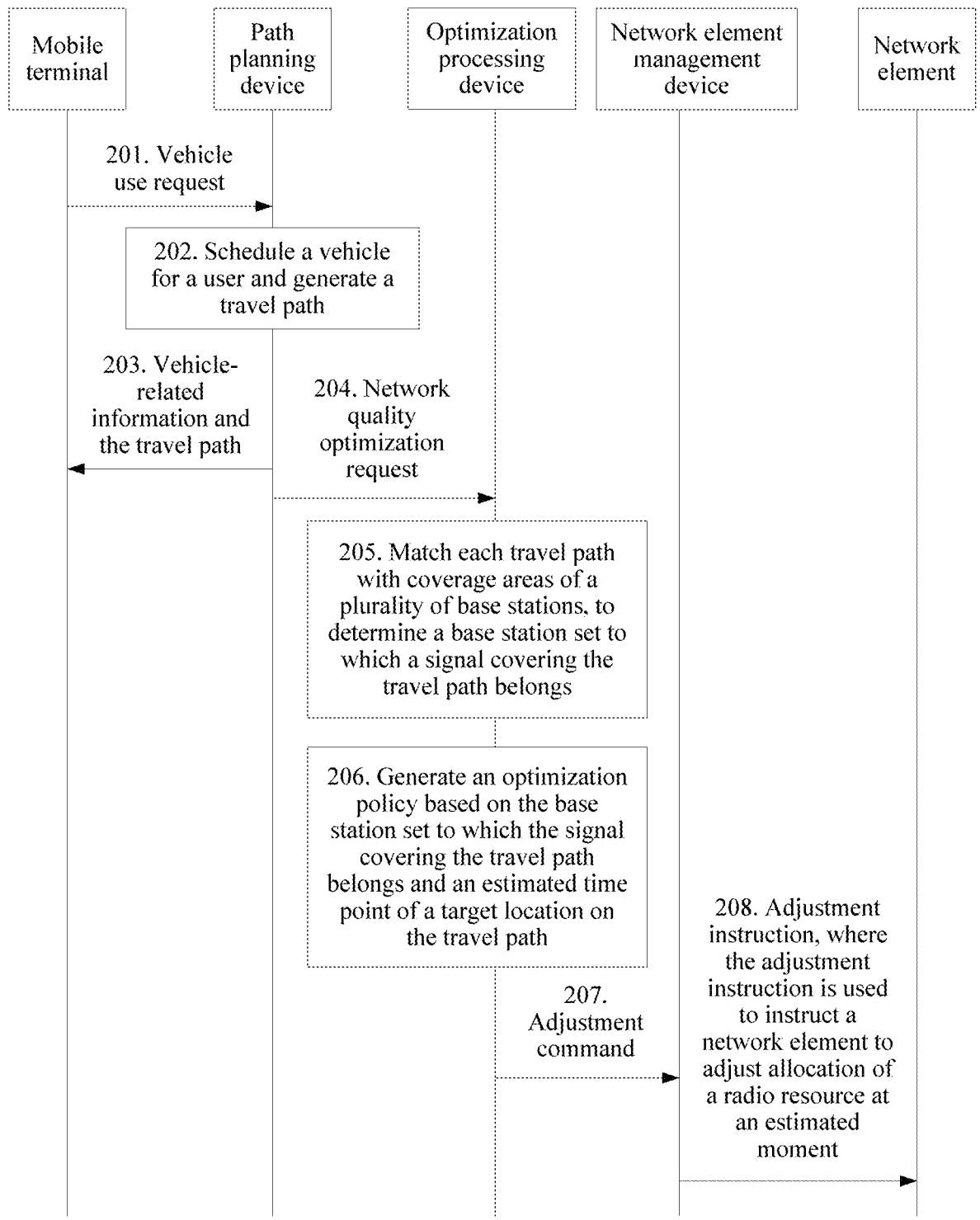
FIG. 2 is a schematic flowchart of steps of a radio resource adjustment method according to an embodiment of this application.
Figure 3:
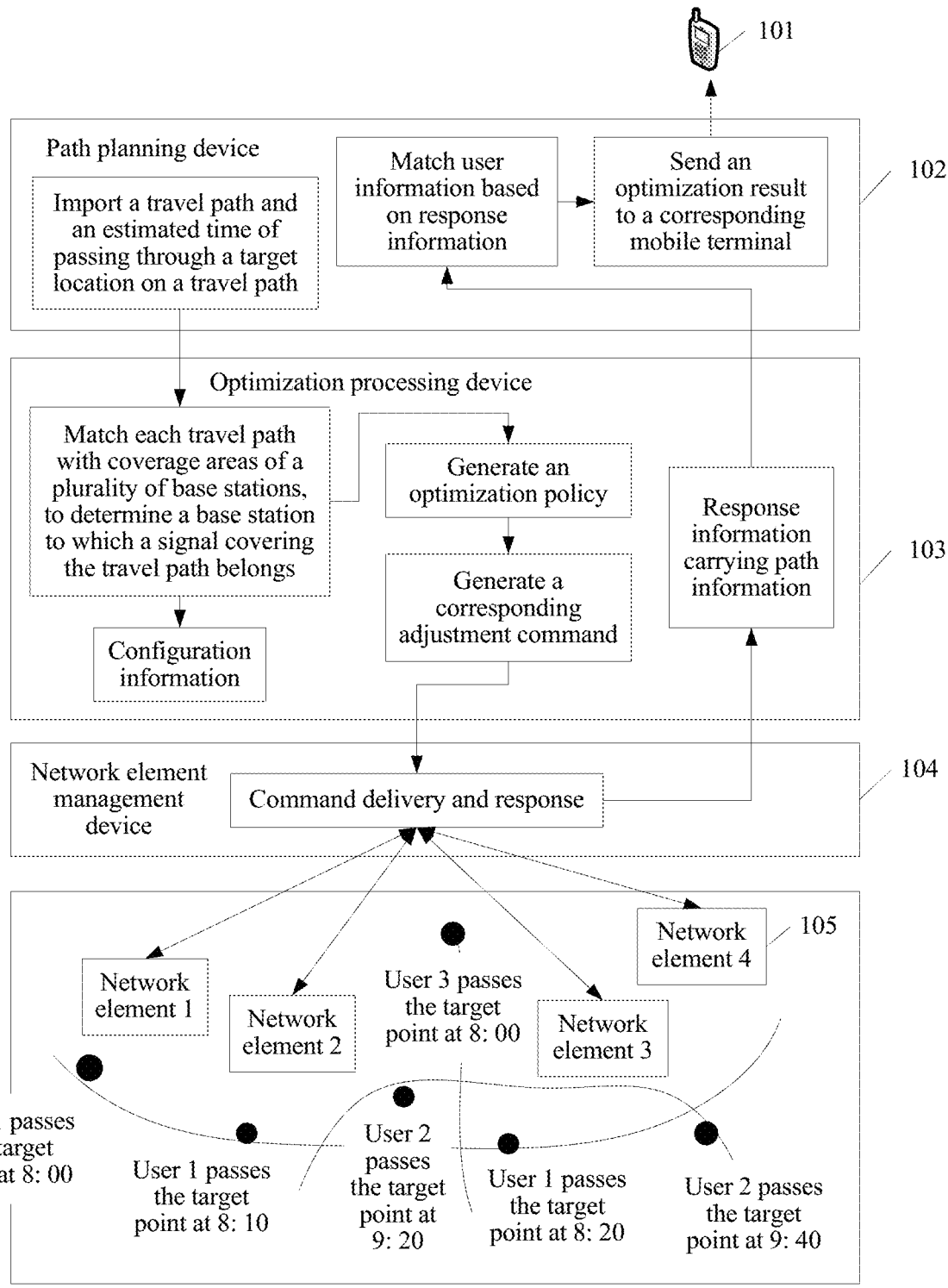
FIG. 3 is a schematic flowchart of a radio resource adjustment method according to an embodiment of this application.

FIG. 2 is a schematic flowchart of steps of a radio resource adjustment method according to an embodiment of this application. FIG. 3 is a schematic flowchart of a radio resource adjustment method according to an embodiment of this application. The following describes in detail the radio resource adjustment method provided in this application with reference to an embodiment. An embodiment of the radio resource adjustment method provided in this application includes the following steps.

Step 201: A mobile terminal sends a vehicle use request to a path planning device.

In an implementation, the vehicle use request carries a departure address, a destination address, a departure time, user information, and the like. The departure address may be an address input by a user, or may be a current location detected by the mobile terminal. The departure time may be a current moment detected by the mobile terminal, or may be a reserved departure moment input by the user, or an estimated departure time period input by the user. In this implementation, a purpose of sending, by the mobile terminal, the vehicle use request to the path planning device is to enable the path planning device to plan a better travel path for the user.

In another implementation, the vehicle use request carries reservation information of a travel path and a reserved time, where the reserved time is a departure moment, or may be a departure time period. In this implementation, a purpose of sending, by the mobile terminal, the vehicle use request to the path planning device is to reserve a determined travel path.

The user information includes but is not limited to a phone number of a user, a name (a nickname or a real name) of the user, and a user level identifier. The user level identifier is used to identify a priority of the user. For example, the user is a common user, a VIP user, and an SVIP user. An identifier "1" indicates a first level and is used to identify the SVIP user; an identifier "2" indicates a second level and is used to identify the VIP user; and an identifier "3" indicates a third level and is used to identify the common user.

Step 202: The path planning device receives the vehicle use request sent by the mobile terminal, schedules a vehicle for the user, and generates a travel path.

When the departure time is the current moment, the vehicle whose departure address is relatively close is matched for the user based on the departure address, to obtain vehicle-related information (for example, a vehicle license plate number and a driver's phone number) of the vehicle. At least one travel path is planned for the user based on the destination address and the departure address. The path planning device may plan a plurality of travel paths, and further select an optimal travel path from the plurality of the travel paths. For example, the optimal travel path is a path with a shortest travel time, a shortest travel distance, unblocked travel, or the like.

For example, the departure address is A, the destination address is B, and the plurality of planned travel paths are (A-C-D-B), (A-E-F-B), and (A-G-H-B). Further, the path planning device may select an optimal travel path from the three travel paths based on a road condition of each travel path, where the road condition includes but is not limited to a predicted congestion condition and a road condition (for example, whether a road is repaired). If the departure time of the user is 8:00 in the morning, and the distances of the three travel paths are similar and are approximately 20 km, but based on historical data, a road segment (D-B) of the travel path (A-C-D-B) is highly congested from 8:00 to 8:30, a road segment (E-F) of the travel path (A-E-F-B) is being built with a subway, and a congestion condition and a road condition are good on the travel path (A-G-H-B). Therefore, the travel path (A-G-H-B) is determined as the optimal travel path. In this example, a specific method for selecting the optimal travel path from the plurality of travel paths is merely an example for ease of description, and does not impose any limitation on this application.

Step 203: The path planning device feeds back the vehicle-related information and information about the travel path to the mobile terminal.

The path planning device sends a vehicle license plate number and a driver's phone number, and the information about the travel path of a matching vehicle to the mobile terminal, and sends the user information (for example, a user's phone number) to a vehicle terminal of the vehicle.

The foregoing step 201 to step 203 are merely for describing interaction between the mobile terminal and the path planning device. In an embodiment, a plurality of mobile terminals may send path planning requests to the path planning device at a same moment, and each path planning request includes user information. The path planning device distinguishes, based on the user information, between path planning requests sent by mobile terminals of different users. For each path planning request, processing steps of the path planning device are described as step 201 to step 203.

Step 204: The path planning device sends a network quality optimization request to an optimization processing device, where the network quality optimization request carries the information about the travel path and the time information corresponding to the information about the travel path, and the time information includes an estimated moment corresponding to a target location on the travel path through which the mobile terminal passes or an estimated time period between two estimated moments. For example, an estimated moment of passing through a first target location is 10:25, or an estimated moment of passing through the first target location is 10:25 to 10:28.

The path planning device identifies an operator to which a phone number in the user information belongs, and for example, sends the network quality optimization request to an optimization processing device of the target operator, where the network quality optimization request is used to request to optimize network coverage quality of the travel path.

The path planning device may determine a priority of the user based on the user level identifier in the user information. If there are a large quantity of users of online ride-hailing vehicles in a time period, a dynamic optimization service of radio network quality cannot be ensured for all users, and only some users can be provided with the optimization service of the radio network quality. Therefore, the path planning device may determine, based on the user level identifier in the user information, whether the user is a VIP user or an SVIP user, and provide the optimization service of the network quality for the VIP user or the SVIP user. Specific steps may be as follows:

a. The path planning device determines, based on the user level identifier, whether the user is a target user, where the target user is a user whose priority is greater than or equal to a threshold. For example, if the threshold is a second level, the target user is an SVIP user and a VIP user; or if the threshold is a first level, the target user is an SVIP user. In this example, that the target user is an SVIP user is used as an example for description.

b. The path planning device determines a travel path of the target user and an estimated moment or an estimated time period corresponding to a target location on the travel path through which the mobile terminal passes.

In an embodiment, the time information includes total duration, a departure moment, and an estimated arrival moment that are of the travel path (for example, A-G-H-B).

Figure 4:
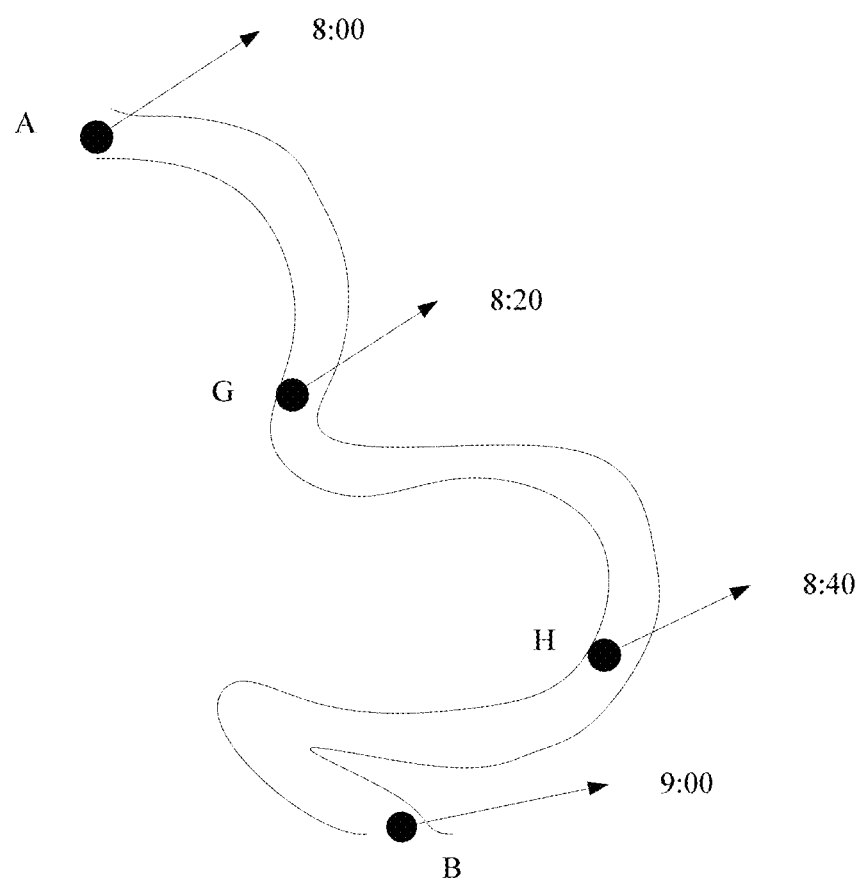
FIG. 4 is a schematic diagram of a scenario according to an embodiment of this application.

In another embodiment, FIG. 4 is a schematic diagram of a scenario according to the embodiment of this application. A travel path of the target user is (A-G-H-B), and the travel path is split into a plurality of path segments. The plurality of path segments include a first road segment (A-G), a second road segment (G-H), a third road segment (H-B), and an estimated moment of passing through each segment point are determined. For example, if a departure moment is 8:00, an estimated moment of passing through a point C (the first target location) is 8:20, an estimated moment of passing through a point H (a second target location) is 8:40, and an estimated moment of arriving at a point B (a third target location) is 9:00. In this example, the travel path is split into a plurality of segments, and an estimated moment at which a vehicle passes through a segment point may be predicted, to implement accurate segmentation. In this example, the estimated moment corresponding to the travel path through which the mobile terminal passes is described by using an estimated moment of a segment point as an example, and this is not a limitative description of this application. Also, for more accurate network optimization, a larger quantity of target locations on the travel path may be determined, and estimated moments at which a vehicle passes through these target locations may be predicted.

In an embodiment, the target user may be dynamically set. For example, if a time period is in not a vehicle use peak time period (for example, 10:00 to 11:00, 14:00 to 17:00, or 22:00 to 7:00), and a threshold is a third level, the target user is a common user, a VIP user, and an SVIP user; if the time period is a vehicle use peak time period (for example, 9:00 to 10:00, 11:00 to 14:00, or 20:00 to 22:00), and the threshold is a second level, the target user is a VIP user and an SVIP user; and if the time period is a vehicle use extreme peak time period (for example, 7:00 to 9:00 or 17:00 to 20:00), and the threshold is a first level, the target user is an SVIP user.

Optionally, at a same moment, the network quality optimization request sent by the path planning device to the optimization processing device may include at least one travel path. For example, the network quality optimization request includes five travel paths and estimated moments corresponding to target locations on the five travel paths, and information about the five travel paths respectively corresponds to user information about five SVIP users. Alternatively, the path planning device sends one network quality optimization request to the optimization processing device for each SVIP user, where the network quality optimization request includes information about a travel path corresponding to an SVIP user.

Step 205: The optimization processing device matches each travel path with coverage areas of a plurality of base stations based on the information about the travel path in the at least one network quality optimization request, to determine a base station set to which a signal covering each travel path belongs, where the base station set includes at least one target base station.

The optimization processing device receives the network quality optimization request, and performs information formatting and preprocessing on the information in the network quality optimization request.

Figure 5:
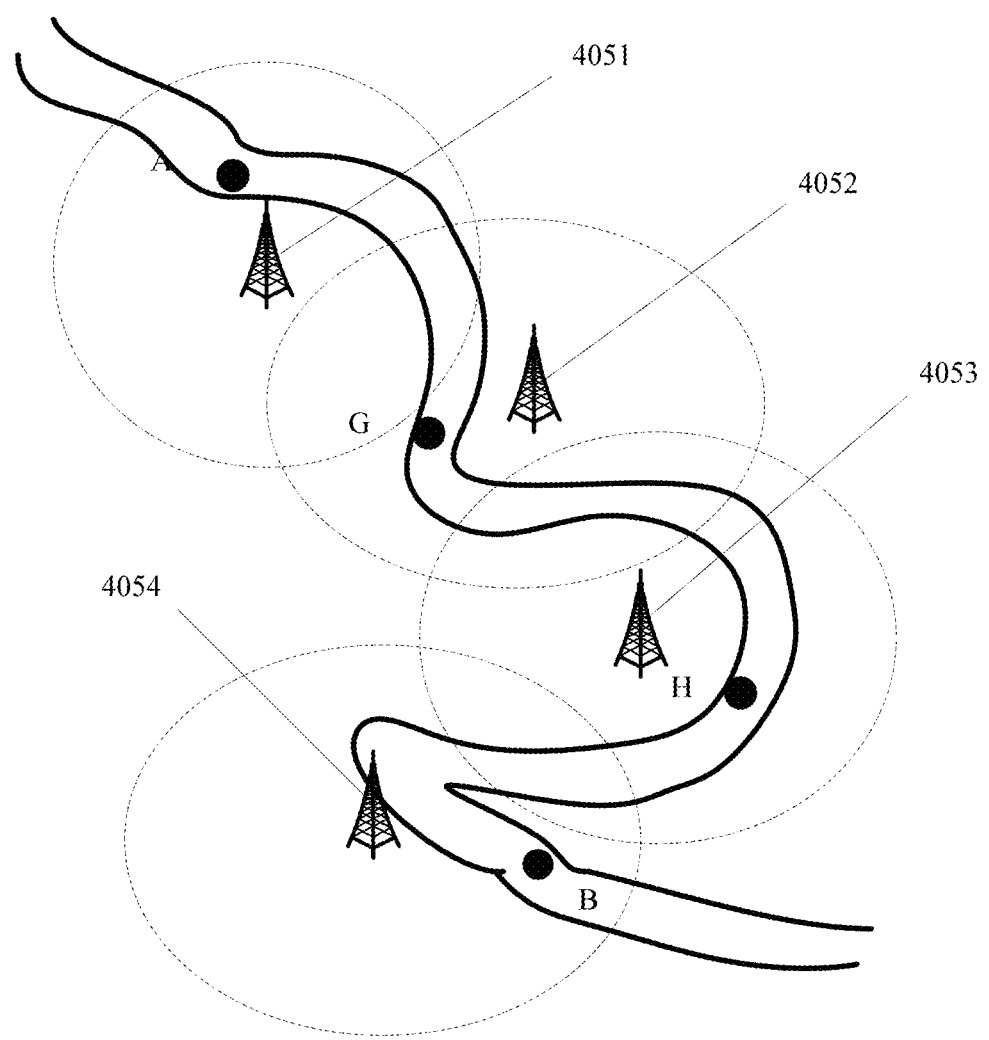
FIG. 5 is a schematic diagram of a scenario according to an embodiment of this application.

In this example, that an area of one travel path is matched with an area covered by at least one base station is used as an example for description. FIG. 5 is a schematic diagram of a scenario according to an embodiment of this application. A plurality of base stations near the travel path (A-G-H-B) are found through search based on a location of the travel path (A-G-H-B), and then an area covered by the plurality of base stations is matched with an area of the travel path, to determine that a base station set that matches each path segment of the travel path includes four base stations, where the four base stations are respectively: a first base station 4051, a second base station 4052, a third base station 4053, and a fourth base station 4054. Areas of radiated signals of the four base stations may cover the entire travel path (A-G-H-B).

In this example, that one travel path is matched with a coverage area of at least one base station is used as an example for description. In an embodiment, at a same moment, the optimization processing device may simultaneously determine a base station that matches each of the plurality of travel paths. A specific method may be understood with reference to a process in which one travel path is matched with the at least one base station in this step. Details are not described herein for the sake of brevity.

Step 206: The optimization processing device generates an optimization policy based on a base station to which a signal covering each travel path belongs and an estimated moment corresponding to a target location on each travel path, where the optimization policy includes configuration information of a radio resource of the corresponding target base station based on a corresponding estimated moment.

One travel path is used as an example for description. The optimization processing device determines, based on a base station that matches a travel path (A-M-G-L-H-N-B), that target locations on the travel path are a point A, a point M, a point G, a point L, a point H, a point N, and a point B, and determines estimated moments of passing through each target location. For example, a moment of passing through the point A is 8:00; an estimated moment of passing through the point M is 8:10; the estimated moment of passing through the point G is 8:20; the estimated moment of passing through the L point is 8:30; the estimated moment of passing through the H point is 8:40; and the estimated moment of passing through the N point is 8:50; and the estimated time of passing through the B point is 9:00.

The mobile terminal accesses different cells at different time points, and each cell has a physical cell identifier. Because the optimization processing device has received, from the path planning device, estimated moments at which a vehicle arrives at different target locations, the optimization processing device may also determine cells accessed by the mobile terminal at different time points. For example, the optimization processing device determines that the mobile terminal accesses a first cell of the first base station at 8:00 and accesses a second cell of the second base station at 8:20.

The optimization processing device performs parameter configuration, based on an estimated moment and a target location arrived at the estimated moment, on a target base station that matches the target location, to obtain the optimization policy. The optimization policy includes configuration information of a radio resource of a corresponding target base station based on a corresponding estimated moment. The configuration information includes but is not limited to parameters such as a beam width of a base station antenna, a tilt angle of the antenna, and a direction of the antenna, and cell coverage is adjusted by using the configuration information, so that communication quality of the mobile terminal can be improved when the user arrives in the area at the estimated moment.

For example, the optimization policy includes the following content: During 8:00 to 8:10, a beam width of an antenna of the first base station is 1 degree, and a downtilt angle of the antenna is 6 degrees; during 8:10 to 8:20, the degree of the antenna of the first base station is 1 degree, and the downtilt angle of the antenna is 7 degrees; and during 8:20 to 8:30, a degree of an antenna of the second base station is 1 degree, a downtilt angle of the antenna is 6 degrees. Details are not described herein for the sake of brevity.

Figure 6:
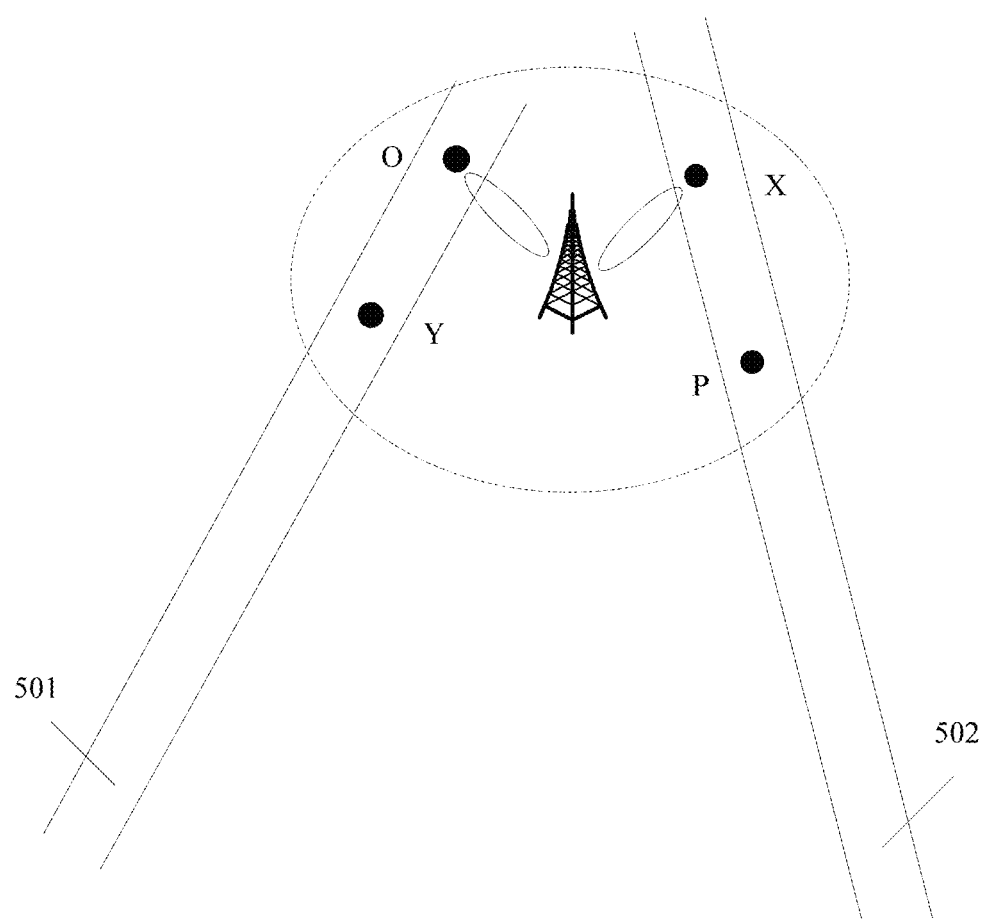
FIG. 6 is a schematic diagram of a scenario according to an embodiment of this application.

One travel path is used as an example for description. In an embodiment, the optimization policy includes configuration information of a target base station corresponding to a plurality of travel paths. FIG. 6 is a schematic diagram of a scenario according to an embodiment of this application. In FIG. 6, two travel paths are used as an example. A travel path A (501) is a travel path corresponding to a user A, and a travel path B (502) is a travel path corresponding to a user B.

Optionally, a network quality optimization request further includes a user level identifier. If, in a same time period, for example, the user A passes through a point O to a point Y during 8:10 to 8:20, and the user B passes through a point X to a point P during 8:10 to 8:20, directions of the travel path A and the travel path B are opposite. When configurations of a same base station conflict in a same time period, an optimization policy may be generated based on a level of the user (VIP or SVIP) or a level of a travel path (a first-level highway, a second-level highway, a third-level highway, or the like). For example, if the user A is a VIP user and the user B is an SVIP user, the direction and the tilt angle that are of the antenna may be adjusted during 8:10 to 8:20 to improve signal coverage of an area of an X point to a P point on a second travel path. For another example, if the travel path A is a second-level highway, and the travel path B is a third-level highway, the direction and the tilt angle that are of the antenna may be adjusted during 8:10 to 8:20 to improve signal coverage of an area from a point O to a point Y on the travel path B. Optionally, configuration information in the optimization policy is dynamically adjusted, and the optimization policy includes a correspondence between each travel path and configuration information corresponding to the travel path. For example, the travel path A corresponds to first configuration information (8:10-8:20, and a downtilt angle of the antenna of the first base station is 6 degrees), and the travel path B corresponds to second configuration information (for example, 8:10-8:20, and a downtilt angle of the antenna of the second base station is 7 degrees). In this embodiment of this application, the optimization policy is dynamically changed. At a first moment, the optimization processing device has generated an optimization policy. The optimization policy includes configuration information for a plurality of travel paths. If a user temporarily cancels a travel plan, the mobile terminal sends a path cancellation request to the path planning device, where the path cancellation request includes information about the travel path A. After receiving the path cancellation request, the path planning device feeds back a response to the mobile terminal, and sends a request to the optimization processing device, where the request carries information about the travel path A that needs to be canceled. The optimization processing device deletes, based on a correspondence between each travel path and a policy corresponding to each travel path, target configuration information for a target travel path (the travel path A) from the optimization policy.

In this embodiment of this application, parameters included in the configuration information are merely an example for ease of description, and this is not a limitative description of this application. In an embodiment, the configuration information may include more optimization-related parameter information, such as transmit power of a base station and a transmission parameter. In this embodiment of this application, the configuration information is described by using a tilt angle of an antenna as an example.

Step 207: The optimization processing device sends an adjustment command to the network element management device based on the optimization policy.

The optimization processing device delivers the adjustment command to the network element management device based on the optimization policy and a sequence, where the sequence is a time sequence, and the optimization policy includes a plurality of pieces of configuration information, for example, configuration information for the travel path A and configuration information for the travel path B. The optimization policy is shown in Table 1.

TABLE 1

| Travel path | Configuration information |
| --- | --- |
| Travel path A | The downtilt angle of the antenna of the first base station is 6 degrees during 8:00 to 8:10. The downtilt angle of the antenna of the second base station is 6 degrees during 8:10 to 8:20. |
| Travel path B | A downtilt angle of the antenna of the third base station is 7 degrees during 9:00 to 9:20. A downtilt angle of the antenna of the fourth base station is 7 degrees during 9:20 to 9:40. |

For example, the optimization processing device may send the adjustment command at a second estimated moment before the first estimated moment included in the optimization policy, where the first estimated moment is an earliest moment in the optimization policy, and preset duration exists between the second estimated moment and the first estimated moment. For example, the preset duration is 5 minutes, and the optimization processing device may send a first adjustment command to the network element management device at 7:55, where the first adjustment command includes: The downtilt angle of the antenna of the first base station is 6 degrees during 8:00 to 8:10, and the downtilt angle of the antenna of the second base station is 6 degrees during 8:10 to 8:20. The optimization processing device sends a second adjustment command to the network element management device at 8:55, where the second adjustment command includes: The downtilt angle of the antenna of the third base station is 7 degrees during 9:00 to 9:20, and the downtilt angle of the antenna of the fourth base station is 7 degrees during 9:20 to 9:40.

Optionally, the adjustment command includes a first instruction and a second instruction, where the first instruction is used to adjust a radio resource of a time period during which the user passes through a target location on a travel path, and the second instruction is used to adjust a radio resource for a time period after the time period during which the user passes through the target location on the travel path. In this embodiment of this application, to optimize signal quality of a signal when a user passes through a travel path, the configuration information includes adjustment to a radio resource of a time period during which the user passes through the travel path. However, after the user passes through a target location on the travel path, communication may still focus on ensuring basic communication quality and a communication capacity. Therefore, after the time period during which the user passes through the travel path, the target base station still needs to adjust a radio resource, namely, to perform a reverse adjustment. For example, the second instruction is used to re-adjust the radio resource of the target base station to a state before the first instruction is sent.

The travel path, the configuration information, and the preset duration are used as an example for description, and this is not a limitative description of this application.

Step 208: The network element management device sends an adjustment instruction to a corresponding network element based on the adjustment command, where the adjustment instruction is used to instruct the network element to adjust allocation of the radio resource at an estimated moment.

After receiving the adjustment command, the network element management device sends the adjustment command to a corresponding network element, where the adjustment command includes a first adjustment instruction and a second adjustment instruction. For example, the network element management device sends the first adjustment instruction to the first base station at 8:00, so that the first base station adjusts the downtilt angle to 6 degrees during 8:00 to 8:10. Then, based on the second adjustment instruction, after 8:10, the downtilt angle is adjusted to an unadjusted state. Likewise, the network element management device sends the first adjustment instruction to the second base station at 8:10, so that the second base station adjusts the downtilt angle of the antenna to 6 degrees during 8:10 to 8:20. The second base station adjusts the downtilt angle to an unadjusted state after 8:20 based on the second adjustment instruction.

After executing the adjustment command, the base station feeds back a first response to the network element management device, where the first response includes information about a travel path, the first response is used to indicate that the target base station has completed the adjustment of the radio resource, and the network element management device feeds back a second response to the optimization processing device based on the first response. The network element management device determines, based on the second response, that the target base station corresponding to the travel path has completed the adjustment of the radio resource.

In this embodiment of this application, the optimization processing device receives the network quality optimization request sent by the path planning device, where the network quality optimization request carries the travel path and the estimated moment corresponding to the target location on the travel path through which the mobile terminal passes. The optimization processing device pre-determines a target location and an estimated moment at which network optimization needs to be performed, matches the travel path with the coverage area of the base station, to determine a base station set to which the signal covering the travel path belongs, and generates an optimization policy based on the target base station in the base station set and the estimated moment, where the optimization policy includes configuration information for configuring the radio resource of the target base station based on an estimated moment when a vehicle arrives. The optimization processing device sends the adjustment command to the network element management device based on the configuration information of the target base station in the optimization policy and the estimated moment, so that the network element management device instructs, based on the adjustment command, the target base station in the base station set to adjust the allocation of the radio resource at the estimated moment. This ensures dynamic optimization configuration of a radio resource on a path at which a user actually travels, thereby fully ensuring radio communications experience of the user in a travelling process or a moving process.

Optionally, the optimization processing device determines an optimization result based on the optimization policy, and the optimization result may be calculated by the optimization processing device based on the optimization policy. For example, the optimization result is used to notify a user of a situation of network quality assurance. For example, the optimization result may be represented by X Mbps. The optimization result may alternatively be carried in the first response fed back by the base station to the network element management device. Then, the second response fed back by the network element management device to the optimization processing device also carries the optimization result. The optimization processing device feeds back a communication quality (an optimization result) of each travel path to the path planning device in real time. The path planning device feeds back the optimization result to a corresponding mobile terminal, to notify the user of current radio network quality, to directly present the network quality to the user, so that the user is more involved.

On the basis of the foregoing embodiment, this application provides another example. In step 202, if a user priority identifier is the first priority, the path planning device determines that the user is an SVIP user based on the user information. For example, the SVIP user is a government official or a leader of a country, and the SVIP user is a user whose travel path needs to be kept strictly confidential. The path planning device generates at least one second path, and the travel path includes information about the first path and the at least one second path. The path planning device associates the at least one second path and the first path with the user information.

The second path in this example is used to scramble the first path, where the first path is a path that is actually traveled by a user, and the second path is used to scramble the path that is actually traveled by the user. The path planning device associates both the first path and the at least one second path with the user information, to prevent the path planning device from being attacked, which may lead to disclosure of an actual travel path of the SVIP user, thereby ensuring security of the SVIP user.

In step 204, the travel path included in the network quality optimization request sent by the path planning device to the optimization processing device may be the first path, that is, an actual travel path of the SVIP. Because the network quality optimization request does not need to carry the user information (such as a user name and a phone number), in this step, the first path may be sent to the optimization processing device, and a scrambled second path does not need to be sent, to save scheduling resources.

Current competition of various online ride-hailing vehicles focuses on vehicle configuration and driver quality, and better network quality is not provided as a service item. However, currently, with introduction of a large quantity of applications of the mobile terminal into the online ride-hailing vehicles, passengers spend most of their time on the online ride-hailing vehicles in browsing information or playing games by using mobile terminals. In this embodiment of this application, network quality of an entire journey of a user can be ensured to a maximum extent, which may become an important service item of applications such as an online ride-hailing vehicle and navigation. In this embodiment of this application, network quality may be optimized as required based on a travel path and an estimated moment corresponding to a target location on the travel path through which the mobile terminal passes, to implement accurate optimization. By optimizing a radio network of a specific travel path, a better network service is provided for a travel user.

Figure 7:
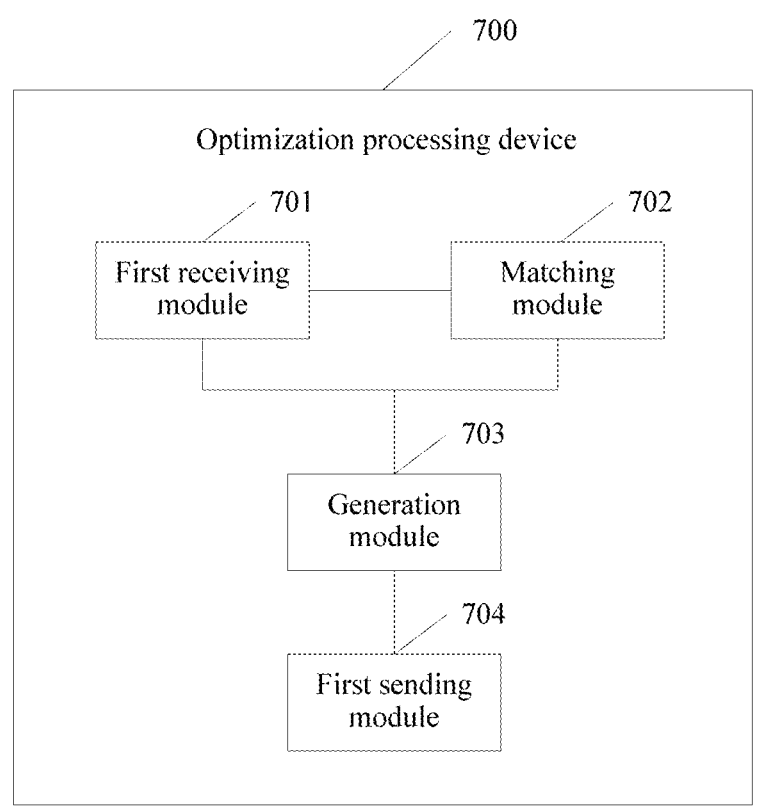
FIG. 7 is a schematic structural diagram of an embodiment of an optimization processing device according to an embodiment of this application.

The foregoing describes a radio resource adjustment method. The following describes an optimization processing device to which the radio resource adjustment method is applied. Referring to FIG. 7, this application provides an embodiment of an optimization processing device 700, including:

a first receiving module 701, configured to receive a network quality optimization request sent by a path planning device, where the network quality optimization request carries a travel path and an estimated moment corresponding to a target location on the travel path through which the mobile terminal passes;

a matching module 702, configured to match the travel path received by the first receiving module 701 with a coverage area of a base station, to determine a base station set to which a signal covering the travel path belongs, where the base station set includes at least one target base station;

a generation module 703, configured to generate an optimization policy based on the base station set determined by the matching module 702 and the estimated moment received by the first receiving module 701, where the optimization policy includes configuration information for configuring a radio resource of the base station set at a corresponding estimated moment; and a first sending module 704, configured to send an adjustment command to a network element management device based on the optimization policy, so that the network element management device instructs, based on the adjustment command, the target base station in the base station set to adjust allocation of the radio resource at the estimated moment.

Optionally, the generation module 703 is further configured to:

determine a target base station that matches each target location;

perform, based on the estimated moment and the target location at which a vehicle arrives at the estimated moment, parameter configuration on the target base station that matches each target location, to obtain configuration information; and generate an optimization policy based on the estimated moment and the configuration information.

Figure 8:
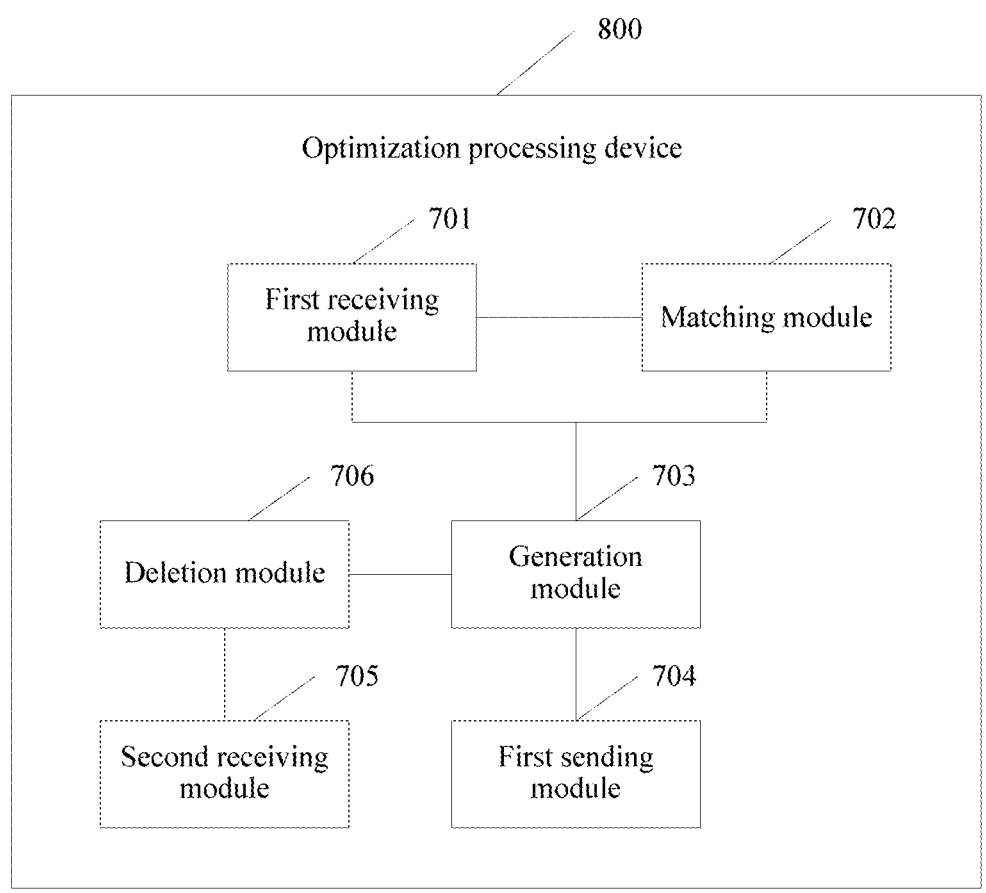
FIG. 8 is a schematic structural diagram of another embodiment of an optimization processing device according to an embodiment of this application.

Based on the embodiment corresponding to FIG. 7, referring to FIG. 8, another embodiment of an optimization processing device 800 provided in this application may include:

The optimization policy includes a correspondence between a travel path and configuration information corresponding to the travel path, and the optimization processing device further includes a second receiving module 705 and a deletion module 706.

The second receiving module 705 is configured to receive a travel path cancellation request sent by the path planning device, where the travel path cancellation request includes information about a target travel path.

The deletion module 706 is configured to delete, based on a correspondence, the target configuration information for the target travel path from the optimization policy generated by the generation module 703.

Figure 9:
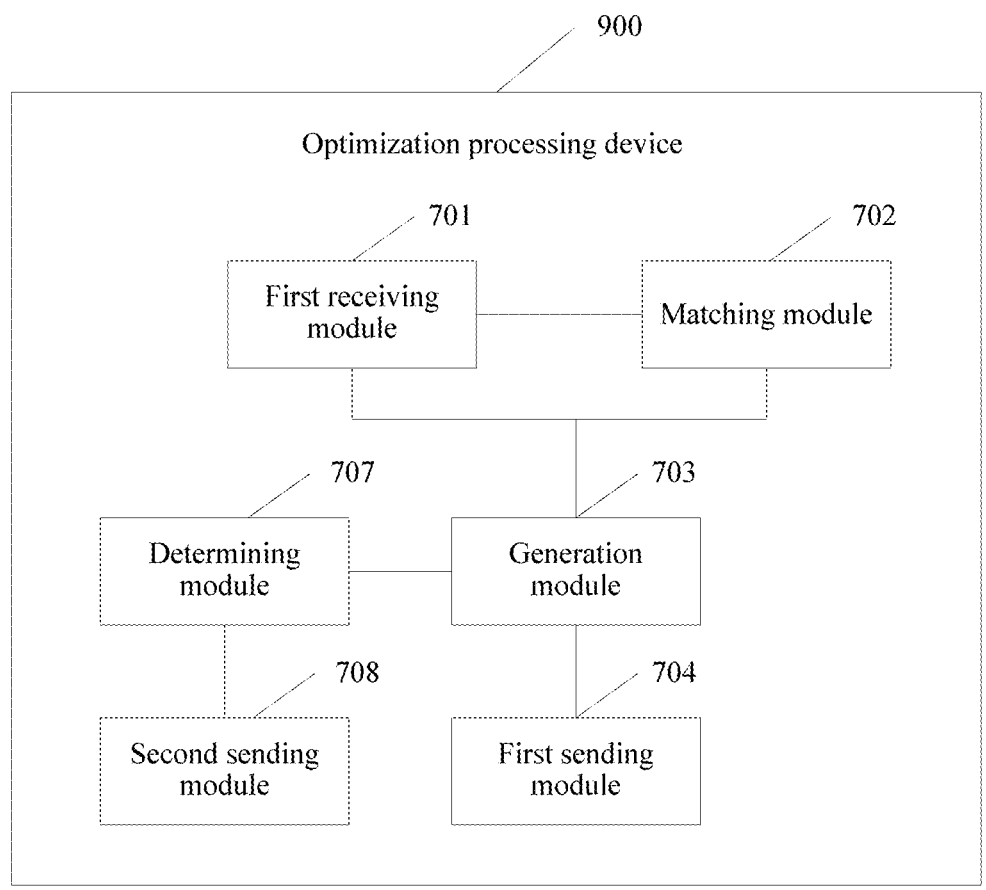
FIG. 9 is a schematic structural diagram of another embodiment of an optimization processing device according to an embodiment of this application.

Based on the embodiment corresponding to FIG. 7, referring to FIG. 9, another embodiment of an optimization processing device 900 provided in this application may include:

a determining module 707, configured to determine an optimization result based on the optimization policy generated by the generation module 703, where the optimization result carries information about a travel path, and the optimization result is used to indicate quality of a signal covering the travel path at the estimated moment; and the second sending module 708 is configured to feed back the optimization result determined by the determining module 707 to the path planning device, so that the path planning device determines, based on the information about the travel path, user information corresponding to the information about the travel path, and sends the signal quality to a mobile terminal corresponding to the user information.

Further, the optimization processing device in FIG. 7 to FIG. 9 is presented in a form of a function module. The "module" herein may be an application-specific integrated circuit (ASIC), a circuit, a processor and a memory that execute one or more software programs or firmware programs, an integrated logic circuit, and/or another component that can provide the foregoing function. In a simple embodiment, the optimization processing device in FIG. 7 to FIG. 9 may take the form shown in FIG. 10.

Figure 10:
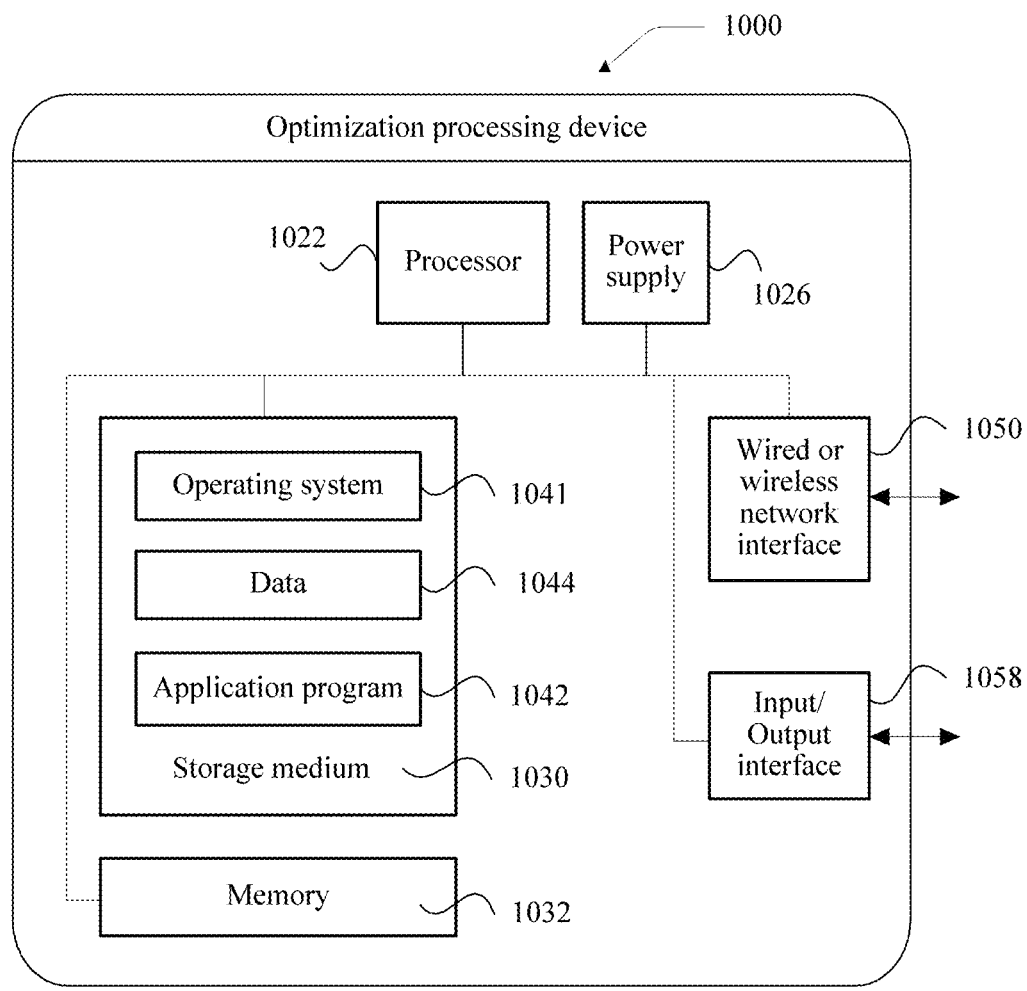
FIG. 10 is a schematic structural diagram of another embodiment of an optimization processing device according to an embodiment of this application.

FIG. 10 is a schematic structural diagram of an optimization processing device 1000 according to an embodiment of this application. The optimization processing device 1000 may vary greatly with different configurations or performance, and may include one or more processors 1022 and memories 1032, and one or more storage media 1030 (such as one or more mass storage devices) for storing an application program 1042 or data 1044. The memory 1032 and the storage medium 1030 each may be a transitory storage or a persistent storage. The program stored in the storage medium 1030 may include one or more modules (not shown in the figure), and each module may include a series of instruction operations for the optimization processing device. Still further, the processor 1022 may be configured to communicate with the storage medium 1030 and perform, in the optimization processing device 1000, the series of instruction operations in the storage medium 1030.

The optimization processing device 1000 may further include one or more power supplies 1026, one or more wired or wireless network interfaces 1050, one or more input/output interfaces 1058, and/or one or more operating systems 1041.

In the foregoing embodiment, steps performed by the optimization processing device may be based on the structure of the optimization processing device shown in FIG. 10.

The processor 1022 enables the optimization processing device to perform the steps actually performed by the optimization processing device in the method embodiment corresponding to FIG. 2.

An embodiment of this application provides a computer storage medium, configured to store computer software instructions used by the foregoing optimization processing device, and the computer software instructions include a program designed in a method actually performed by the optimization processing device in the method embodiment corresponding to FIG. 2.

Figure 11:
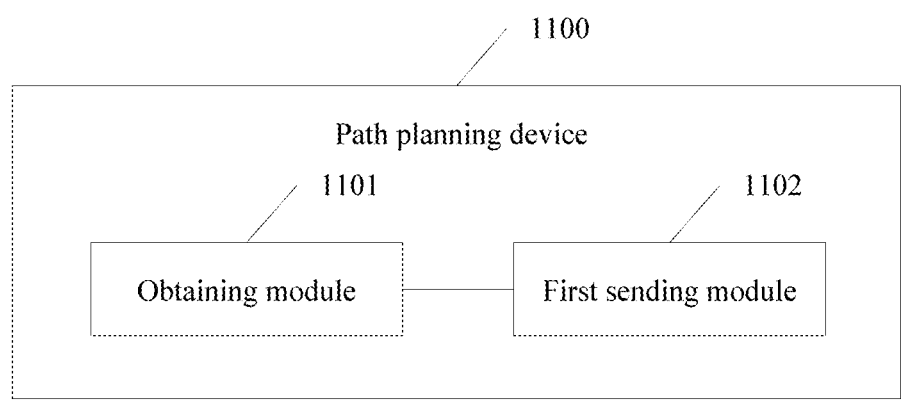
FIG. 11 is a schematic structural diagram of an embodiment of a path planning device according to an embodiment of this application.

The foregoing describes a structure of an optimization processing device. The following describes a path planning device to which the radio resource adjustment method is applied. Referring to FIG. 11, this application provides an embodiment of a path planning device 1100, including:

an obtaining module 1101, configured to obtain a travel path and an estimated moment corresponding to a target location on the travel path through which a mobile terminal passes; and a first sending module 1102, configured to send a network quality optimization request to an optimization processing device, where the network quality optimization request includes the travel path and the estimated moment of the obtaining module 1101, so that the optimization processing device matches the travel path with a coverage area of a base station based on the travel path, to determine a base station set to which a signal covering the travel path belongs; generates an optimization policy based on the base station set and the estimated moment, where the optimization policy includes configuration information for configuring a radio resource of the base station set based on a corresponding estimated moment; and sends an adjustment command to a network element management device based on the optimization policy, so that the network element management device instructs, based on the adjustment command, the base station set to adjust allocation of the radio resource at the estimated moment.

Optionally, the obtaining module 1101 is further configured to:

receive a path planning request sent by the mobile terminal, where the path planning request includes user information, a start location, a destination location, and a departure time;

plan, based on a start location and a destination location, a travel path corresponding to user information; and determine, based on the travel path and the departure time, the estimated moment corresponding to the target location on the travel path through which the mobile terminal passes.

Optionally, the obtaining module 1101 is further configured to:

receive travel path reservation information sent by the mobile terminal, where the travel path reservation information includes user information, a travel path, and information about a moment of departing from a start point of the travel path; and determine, based on the travel path and the departure time, the estimated moment corresponding to the target location on the travel path through which the mobile terminal passes.

Figure 12:
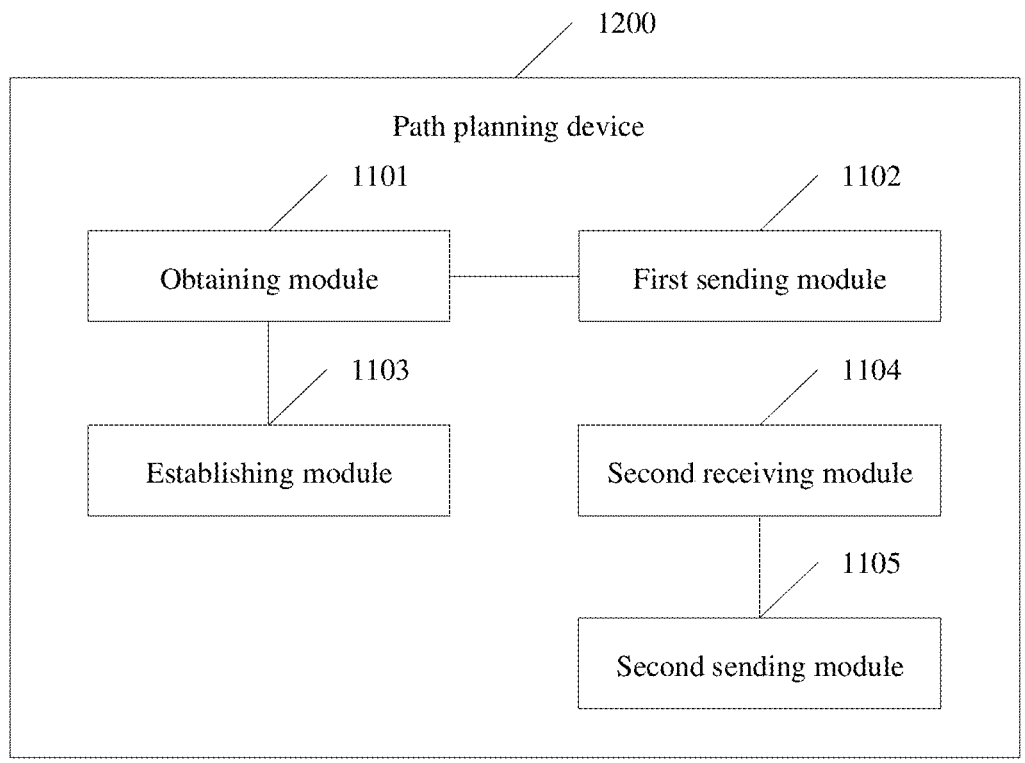
FIG. 12 is a schematic structural diagram of another embodiment of a path planning device according to an embodiment of this application.

Based on the embodiment corresponding to FIG. 11, referring to FIG. 12, another embodiment of a path planning device 1200 provided in this application may include:

The path planning device further includes an establishing module 1103, a second receiving module 1104, and a second sending module 1105.

The establishing module 1103 is configured to establish a correspondence between a travel path and user information obtained by the obtaining module 1101.

The second receiving module 1104 is configured to receive an optimization result fed back by an optimization processing device, where the optimization result is used to indicate quality of a signal covering the travel path at the estimated moment.

The second sending module 1105 is configured to feed back, signal quality on the travel path received by the second receiving module 1104, to the mobile terminal corresponding to the user information based on the correspondence between the user information and the travel path established by the establishing module 1103.

Optionally, the user information includes a user priority identifier, and the travel path includes a first path and at least one second path. The obtaining module 1101 is further configured to:

when the user priority identifier indicates a first priority, determine a first path corresponding to the user information, where the first path is a path that is estimated by a user to an actual travel; and generate at least one second path, where the second path is an interference path of the first path.

The establishing module 1103 is further configured to establish a relationship between user information and at least one second path and a first path.

Figure 13:
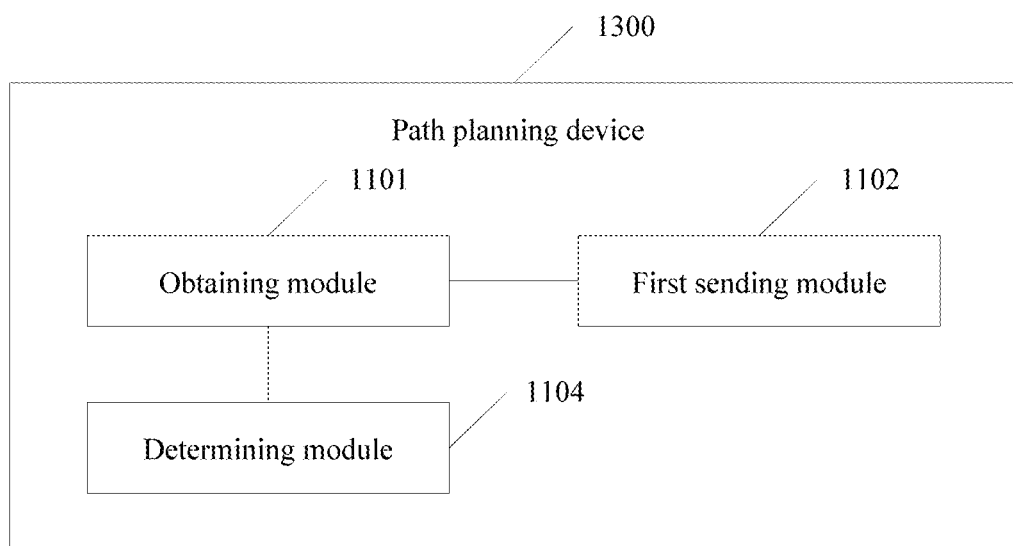
FIG. 13 is a schematic structural diagram of another embodiment of a path planning device according to an embodiment of this application.

Based on the embodiment corresponding to FIG. 11, referring to FIG. 13, another embodiment of a path planning device provided in this application may include:

The user information includes a user level identifier, where the user level identifier is used to indicate a priority of the user, a travel path corresponds to the target user, and the path planning device further includes a determining module; and the determining module 1104 is configured to determine a target user based on the user level identifier obtained by the obtaining module 1101, where the target user is a user whose priority is greater than or equal to a threshold.

Further, the path planning device in FIG. 11 to FIG. 13 is presented in a form of a function module. The "module" herein may be an ASIC, a circuit, a processor and a memory that execute one or more software programs or firmware programs, an integrated logic circuit, and/or another component that can provide the foregoing function. In a simple embodiment, the path planning device in FIG. 11 to FIG. 13 may take the form shown in FIG. 14.

Figure 14:
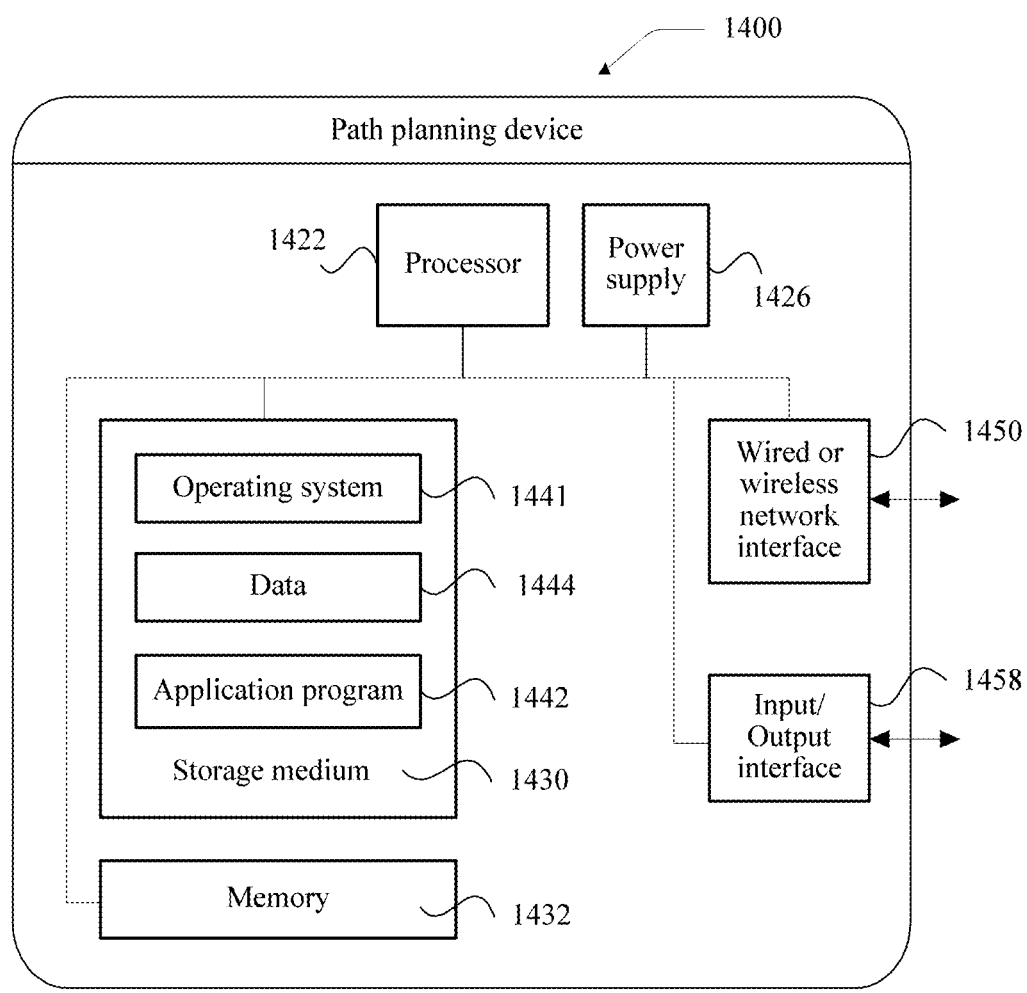
FIG. 14 is a schematic structural diagram of another embodiment of a path planning device according to an embodiment of this application.

FIG. 14 is a schematic structural diagram of a path planning device according to an embodiment of this application. The path planning device 1400 may vary greatly with different configurations or performance, and may include one or more processors 1422 and memories 1432, and one or more storage media 1430 (such as one or more mass storage devices) for storing an application program 1442 or data 1444. The memory 1432 and the storage medium 1430 each may be a transitory storage or a persistent storage. The program stored in the storage medium 1430 may include one or more modules (not shown in the figure), and each module may include a series of instruction operations for the path planning device. Still further, the processor 1422 may be configured to communicate with the storage medium 1430 and perform, in the path planning device 1400, the series of instruction operations in the storage medium 1430.

The path planning device 1400 may further include one or more power supplies 1426, one or more wired or wireless network interfaces 1450, one or more input/output interfaces 1458, and/or one or more operating systems 1441.

In the foregoing embodiment, steps performed by the path planning device may be based on the structure of the path planning device structure shown in FIG. 14.

The processor 1422 enables the path planning device to perform the steps actually performed by the path planning device in the method embodiment corresponding to FIG. 2.

An embodiment of this application provides a computer storage medium, configured to store computer software instructions used by the foregoing path planning device, and the computer software instructions include a program designed in a method actually performed by the path planning device in the method embodiment corresponding to FIG. 2.

It may be clearly understood by a person of ordinary skill in the art that, for the purpose of convenient and brief description, for a detailed working process of the foregoing system, apparatus, and unit, reference may be made to a corresponding process in the foregoing method embodiments, and details are not described herein again for the sake of brevity.

In a plurality of embodiments provided in this application, it can be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments essentially, or the part contributing to the prior art, or all or some of the technical solutions may be implemented in the form of a software product. The computer software product is stored in a storage medium and includes several instructions for instructing a computer device (which may include a personal computer, a server, or a network device) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing embodiments are merely intended for describing the technical solutions of this application, but not for limiting this application. Although this application is described in detail with reference to the foregoing embodiments, persons of ordinary skill in the art can understand that they may still make modifications to the technical solutions described in the foregoing embodiments or make equivalent replacements to some technical features thereof, without departing from the scope of the technical solutions of the embodiments of this application.

What is claimed is:

1. A radio resource adjustment method, comprising:
   receiving a network quality optimization request sent by a path planning device, wherein the network quality optimization request carries a travel path and an estimated moment corresponding to a target location on the travel path through which a mobile terminal passes;
   matching the travel path with a coverage area of a base station, to determine a base station set to which a signal covering the travel path belongs, wherein the base station set comprises at least one target base station;
   generating an optimization policy based on the base station set and the estimated moment, wherein the optimization policy comprises configuration information for configuring a radio resource of the at least one target base station in the base station set based on a corresponding estimated moment, wherein the configuration information includes a beam width of a base station antenna and at least one of a tilt angle of the base station antenna, and a direction of the base station antenna; and sending an adjustment command to a network element management device based on the optimization policy, so that the network element management device instructs, based on the adjustment command, the at least one target base station in the base station set to adjust allocation of the radio resource at the estimated moment.

2. The radio resource adjustment method according to claim 1, wherein the generating the optimization policy based on the base station set and the estimated moment comprises:

determining the at least one target base station that matches the target location, wherein the target location is a plurality of target locations, and the at least one target base station is determined as being match each of the plurality of target locations;

performing, based on the estimated moment and the target location at which a vehicle arrives at the estimated moment, parameter configuration on the at least one target base station that matches each target location, to obtain configuration information; and generating the optimization policy based on the estimated moment and the configuration information.

3. The radio resource adjustment method according to claim 1, wherein the optimization policy comprises a correspondence between the travel path and the configuration information corresponding to the travel path, and the method further comprises:

receiving a travel path cancellation request sent by the path planning device, wherein the travel path cancellation request comprises information about a target travel path; and deleting target configuration information for the target travel path from the optimization policy based on the correspondence.

4. The radio resource adjustment method according to claim 1, wherein after the generating the optimization policy based on the base station set and the estimated moment, the method further comprises:

determining an optimization result based on the optimization policy, wherein the optimization result carries information about the travel path, and the optimization result is used to indicate quality of the signal covering the travel path at the estimated moment; and feeding back the optimization result to the path planning device, so that the path planning device determines, based on the information about the travel path, user information corresponding to the information about the travel path, and sends the signal quality to the mobile terminal corresponding to the user information.

5. A radio resource adjustment method, comprising:

obtaining a travel path and an estimated moment corresponding to a target location on the travel path through which a mobile terminal passes;

sending a network quality optimization request to an optimization processing device, wherein the network quality optimization request comprises the travel path and the estimated moment, so that the optimization processing device matches the travel path with a coverage area of a base station based on the travel path, to determine a base station set to which a signal covering the travel path belongs;

generating an optimization policy based on the base station set and the estimated moment, wherein the optimization policy comprises configuration information for configuring a radio resource of the base station set based on a corresponding estimated moment, wherein the configuration information includes a beam width of a base station antenna and at least one of a tilt angle of the base station antenna, and a direction of the base station antenna; and sending an adjustment command to a network element management device based on the optimization policy, so that the network element management device instructs, based on the adjustment command, the base station set to adjust allocation of the radio resource at the estimated moment.

6. The radio resource adjustment method according to claim 5, wherein the obtaining the travel path and the estimated moment corresponding to the target location on the travel path through which the mobile terminal passes comprises:

receiving a path planning request sent by the mobile terminal, wherein the path planning request comprises user information, a start location, a destination location, and a departure time;

planning, based on the start location and the destination location, the travel path corresponding to the user information; and determining, based on the travel path and the departure moment, the estimated moment corresponding to the target location on the travel path through which the mobile terminal passes.

7. The radio resource adjustment method according to claim 5, wherein the obtaining the travel path and the estimated moment corresponding to the target location on the travel path through which the mobile terminal passes comprises:

receiving travel path reservation information sent by the mobile terminal, wherein the travel path reservation information comprises user information, the travel path, and information about a moment of departing from a start point of the travel path; and determining, based on the travel path and the departure moment, the estimated moment corresponding to the target location on the travel path through which the mobile terminal passes.

8. The radio resource adjustment method according to claim 6, wherein the method further comprises:

establishing a correspondence between the travel path and the user information;

receiving an optimization result of the optimization processing device, wherein the optimization result is used to indicate quality of the signal covering the travel path at the estimated moment; and feeding back, based on the correspondence between the travel path and the user information, the signal quality on the travel path to the mobile terminal corresponding to the user information.

9. The radio resource adjustment method according to claim 5, wherein user information comprises a user priority identifier, and the travel path comprises a first path and at least one second path; and the obtaining the travel path comprises:

when the user priority identifier indicates a first priority, determining a first path corresponding to the user information, wherein the first path is a path that is estimated by a user to an actual travel; and generating the at least one second path, wherein the at least one second path is an interference path of the first path; and the method further comprises:
establishing an association relationship between the user information and the at least one second path and the first path.

10. The radio resource adjustment method according to claim 5, wherein user information comprises a user level identifier, the user level identifier is used to indicate a priority of the user, the travel path corresponds to the target user, and before the sending the network quality optimization request to the optimization processing device, the method further comprises:
determining the target user based on the user level identifier, wherein the target user is a user whose priority is greater than or equal to a threshold.

11. An optimization processing device, comprising:
a memory, configured to store computer executable program code;
a network interface, and
a processor, coupled to the memory and the network interface, wherein
the program code comprises an instruction, and when the processor executes the instruction, the instruction enables the optimization processing device to perform the radio resource adjustment method according to claim 1.

* * * * *